Patented Aug. 27, 1940

2,212,952

UNITED STATES PATENT OFFICE 2,212,952

CATALYTIC CONDENSATION OF HYDROCARBONS

Roderick D. Pinkerton, Chicago, Ill., and William Mendius, Munster, Ind., assignors to Sinclair Refining Company, New York, N. Y., a corporation of Maine No Drawing. Application February 18, 1939, Serial No. 257,103

11 Claims. (Cl. 196—10)

This invention relates to improvements in the catalytic condensation of normally gaseous hydrocarbons to produce normally liquid hydrocarbons of gasoline boiling range.

The normally gaseous hydrocarbons to which we refer more particularly are those saturated, or paraffin, and unsaturated, or olefine, hydrocarbons containing four and less carbon atoms per molecule, methane, ethane, ethylene, propane, propylene, normal butane, isobutane, normal butylene and isobutylene. These hydrocarbons may be designated the $C_1$, $C_2$, $C_3$ and $C_4$ compounds, or collectively the $C_{4-}$ compounds. The normally liquid hydrocarbons to which we refer are those containing five or six or more carbon atoms per molecule within the boiling range of gasoline, which may be designated the $C_{5+}$ or the $C_{6+}$ compounds.

The term "catalytic condensation" as applied to such hydrocarbons includes polymerization of unsaturates and alkylation or reaction between saturates and unsaturates. Catalytic polymerization of unsaturates has been proposed, and practiced, as a method of recovering motor fuel gasoline of special value from less valuable hydrocarbon gas mixtures containing sufficient unsaturated components. Gas mixtures so processed have included gas mixtures from cracking operations containing as produced sufficient unsaturated components and gas mixtures preliminarily processed, catalytically or thermally, to produce sufficient unsaturated components by decomposition of saturated components. While some of these previous proposals and practices have involved incidental alkylation, the conditions of operation have tended to suppress alkylation rather than to promote this type of reaction. Alkylation and polymerization are, in some respects, inconsistent reactions, and consequently it is not unnatural that those seeking to effect condensation by polymerization should have avoided conditions promoting alkylation.

We have discovered that, by appropriate correlation of charging stock, temperature, pressure and catalyst, we can effect condensation with substantial alkylation, either with concurrent polymerization or to the substantial exclusion of polymerization. By means of this correlation the process of our invention effects catalytic condensation of mixtures of normally gaseous hydrocarbons including saturates and unsaturates to produce gasoline-like hydrocarbon products, superior in important respects to those of polymerization processes in which alkylation if occurring at all is merely incidental, with several important process advantages.

In carrying out the process of our invention, we use as a charging stock a mixture of normally gaseous hydrocarbons substantially free from ethane and consisting predominantly of $C_{4-}$ hydrocarbons containing not less than about 40, or better 50, mol percent. of propanes and butanes, advantageously not less than about 20, or better 25, mol percent. of propane and not more than about 20 mol percent. of normal butylene and isobutylene on its total content of $C_{4-}$ hydrocarbons. The charging stock may further contain a substantial proportion of $C_5$ hydrocarbons. We pass this charging stock in contact with a phosphoric acid catalyst at a temperature of about 200° to 450° F., or better about 200° to 360° F., under a pressure upwards of about 500 lbs. per square inch, or better upwards of about 700 lbs. per square inch, and we thereby effect substantial condensation of saturates and unsaturates, that is, we effect substantial condensation by alkylation. The ethane and ethylene content of the gaseous hydrocarbons subjected to the catalyst contact is with advantage kept at the lowest possible figure and it is ever desirable to wholly eliminate these $C_2$ hydrocarbons from the gaseous mixture.

In our process, using a phosphoric acid catalyst, correlation of charging stock composition, temperature and pressure are important, but of these three factors correlation of charging stock composition and temperature appear to be more important, or at least more critical, than the pressure. As previously noted, alkylation reactions and polymerization reactions are inconsistent in some respects. In particular, olefines may react either with olefines or with paraffins, whereas the paraffins react only with olefines. Consequently, with a charging stock of given composition, olefines become less available for reaction with paraffins to the extent that they react with each other. In carrying out our process, polymerization is suppressed at least to the extent to which it interferes with substantial alkylation.

We have observed that the paraffins are apparently more reactive with respect to alkylation as they decrease in molecular size. Specifically, we have found that propane is more reactive with respect to alkylation than are the butanes, and that ethane is in turn more reactive than propane. The olefines, on the other hand, appear to be more reactive with respect to polymerization as their molecular size increases at least within the range of normally gaseous hydrocarbons. We have discovered that a charging stock containing a substantial proportion of propane and a negligible proportion of ethane will yield a greater liquid volume of a gasoline-like product per volume of paraffins converted during alkylation than if the aforesaid concentration of propane and ethane were reversed. This increased yield is due to the fact that propane has a greater molecular weight than ethane and to the fact that only one paraffin molecule will combine with one olefine molecule. Thus, if the normal ethane content of the charging stock is reduced to a minimum and this deficiency is made up by an additional quantity of propane, the propane will be more completely combined with olefines than if a substantial quantity of ethane were present preferentially to combine with these olefines. The theoretical increase in yield of liquid polymer by the alkylation of propane, in lieu of ethane, with amylene, butylene, and propylene varies from 12% to 14%. The utilization of a paraffin which will give the largest liquid volume of polymer per unit volume of paraffins alkylated is particularly advantageous when it is realized that only part of the available paraffins in a charge of normally gaseous hydrocarbons is subject to alkylation because this charge usually contains a lesser proportion of olefines than paraffins and because the alkylation reaction is accompanied by a certain amount of olefine polymerization. Thus, the use of propane as a substitute for ethane offers several economical advantages.

We have also found that lower temperatures tend to promote alkylation and to suppress polymerization whereas higher temperatures, at least within the range in which alkylation might otherwise be effected, tend to promote polymerization and to suppress alkylation. In our process, the composition of the charging stock and the temperature of catalyst contact are further interrelated in that, with any given temperature, alkylation can also be promoted by lowering the concentration of olefines in the gas mixture, by lowering the concentration of olefines more reactive with respect to polymerization in the gas mixture or by increasing the concentration of paraffins more reactive with respect to alkylation in the gas mixture.

In the process of our invention, these several factors are correlated as follows: The temperature of catalyst contact is limited to a range in which substantial alkylation can be effected. At temperatures above about 330° to 360° F. consumption of olefines in polymerization begins to interfere with the alkylation reaction particularly if the gas mixture includes a substantial content of olefines more reactive with respect to polymerization. Temperatures above about 450° F. do not appear to be useful if substantial alkylation is to be effected. At temperatures below about 200° F. difficulties are encountered with respect to control of moisture content of the catalyst, softening of the catalyst and the stripping of condensation products from the catalyst. The composition of the charging stock is controlled, with respect to the temperature of catalyst contact and the pressure, to promote alkylation and to limit polymerization impeding effective alkylation. The charging stock composition is controlled to include not less than about 40 mol percent. of propane and butanes on its total content of $C_4-$ hydrocarbons and, with advantage, to contain not less than about 20 mol percent. of a paraffin more reactive with respect to alkylation, propane, on its total content of $C_4-$ hydrocarbons, and with advantage to contain a minimum or negligible amount of $C_2$ hydrocarbons. The charging stock composition is controlled to include a substantial proportion but not more than about 20 or 22 mol percent. of olefines more reactive with respect to polymerization, the butylenes, on its total content of $C_4-$ hydrocarbons and, with advantage, a substantial proportion but not more than about 25 or 30 mol percent. of propylene and butylenes on its total content of $C_4-$ hydrocarbons. Pressures upwards of about 500 lbs. per square inch are useful in our process. In this range somewhat higher pressures appear to be more useful than the lower pressures. Such higher pressures, upwards of about 700 lbs. per square inch, for example, may assist in suppressing polymerization and promoting alkylation.

The period of catalyst contact is not critical. It must be sufficient to effect the desired reactions, but it appears to have little if any part in the distribution of olefine consumption between polymerization reactions and alkylation reactions. Prolonged periods of catalyst contact may involve some alkylation of condensation products originally produced by polymerization. Within the region of catalyst contact, the hydrocarbons present may exist in liquid phase, in vapor phase or in a mixture of liquid and vapor phases. The relatively low temperatures and the relatively high pressures used in our process tend towards the maintenance of at least some liquid material within the region of catalyst contact, and some incidental advantages flow from this circumstance to the extent that such liquid phase conditions exist.

We use the known phosphoric acid condensation catalysts in carrying out our process. An appropriate phosphoric acid catalyst may be prepared, for example, by mixing orthophosphoric acid or pyrophosphoric acid with an appropriate carrier, siliceous materials such as kieselguhr or an aluminum silicate for example, and calcining the mixture at a temperature of 350° to 750° F. The calcined catalyst may comprise three parts by weight of the phosphoric acid compound and one part by weight of the carrier, for example. The calcined mixture may be ground and sized or pelleted, or some carbonaceous material may be incorporated into the mixture prior to calcination to render the calcination product porous.

Special apparatus for carrying out the process of our invention is not necessary. The catalyst contact chamber may be of any conventional design appropriate to effect thorough contact between the catalyst arranged within the chamber and the charge passed therethrough and may be provided with any conventional means for maintenance and control of the proper temperature conditions therein. As a matter of catalyst economy, the charge is with advantage preheated to the reaction temperature prior to its introduction into the catalyst chamber. Heat exchange between the charge and materials flowing through other parts of the system may be utilized in such preheating as may be expedient in any particular system. Conventional recovery and fractionation equipment may be used to collect and separate the liquid hydrocarbon product of gasoline boiling range.

The following tabulation comprising specific operations embodying our invention will further illustrate the process of our invention as well as the increased yield obtainable by using a charging stock containing a negligible quantity of ethane and an amount of propane substantially in excess of the usual propane content of normally gaseous hydrocarbon mixtures. This tabulation presents operating data for an alkylation system using two towers packed with catalyst through which the charging stock is passed. These operating data are given for a charge containing a predominating amount of ethane and a relatively small proportion of propane, designated the Ethane run, and for a charge containing an increased amount of propane in lieu of ethane, designated the Propane run.

|  | Ethane run | Propane run |
|---|---|---|
| Temperature, ° F.: | | |
| Tower #1 | 250 | 250 |
| #2 | 350 | 350 |
| Pressure, pounds gauge: | | |
| Tower #1 | 1,000 | 1,000 |
| #2 | 700 | 700 |
| Feed rate, gal./hr./#catalyst: | | |
| Tower #1 | 0.114 | 0.107 |
| #2 | 0.114 | 0.107 |
| Feed stock: | | |
| $C_2H_4$ mol. percent | 0.5 | 0.0 |
| $C_2H_6$ mol. percent | 17.3 | 0.0 |
| $C_3H_6$ mol. percent | 3.0 | 5.9 |
| $C_3H_8$ mol. percent | 9.5 | 30.1 |
| $C_4H_8$ mol. percent | 17.4 | 15.6 |
| $C_4H_{10}$ mol. percent | 44.4 | 48.4 |
| $C_5$ mol. percent | 7.9 | 0.0 |
| Yield, gal. $C_{6+}$/# of olefine consumed | 0.179 | 0.211 |
| Increase in yield by Propane run over Ethane run, percent | | 18.0 |

From the foregoing tabulation it will be observed that a charging stock containing propane to the substantial exclusion of ethane provides an 18% increase in yield over that obtained from a charge containing a relatively large quantity of ethane and a relatively small quantity of propane. This increase of 18% is higher than the theoretical increase in yield, and the portion of this higher increase in excess of the theoretical increase is probably due to the fact that in the Ethane run ethane reacted with ethylene to form butane which was not considered as part of the yield in the Ethane run.

Charging stocks containing a predominating amount of propanes and butanes and a relatively small amount of ethane may be obtained as release gases from the stabilization of refinery cracked distillates. The $C_2$ hydrocarbons in this release gas may be removed in order to lower the $C_2$ hydrocarbon content of this charging stock to a minimum. Furthermore, the dry gases from cracking and stabilizing operations contain large amounts of propane and propylene which can be separated from the other constituents of the gaseous mixture and can be used with particular advantage in our alkylation process as supplemental charge to the process. The concentration of propane in the charging stock may also be increased by recycling a side stream from a polymer stabilizer in the alkylation process, this side stream comprising essentially propane and unconverted propylene.

The gasoline-like condensation product of the process of our invention usually exhibits higher octane values than products derived from the same mixtures of normally gaseous hydrocarbon by polymerization without substantial alkylation. The products of our invention also usually exhibit a substantially better blending value. These characteristics of the products of our invention materially increase their value. By "octane value" we refer to the octane number determined by the Cooperative fuel research motor method. By "blending value" we refer to the apparent octane value of the product in blends with other gasolines of known lower octane value.

The product of our process is also more saturated than the comparable product produced by polymerization without substantial alkylation. This quality of the product is usually determined by its bromine addition number. Olefines react with olefines, polymerization, tending to produce an unsaturated product, whereas olefines react with paraffins, alkylation, tending to produce a saturated product.

One advantage of our process is improved yield. Our invention makes possible the recovery of yields substantially larger than could be had from polymerization of unsaturates to the substantial exclusion of alkylation. Our invention enables the recovery of yields deriving as much as 20% to 50% or more from saturates and further enables the recovery of yields 12% to 14% and more in excess of yields heretofore obtainable when a charging stock containing a substantial amount of $C_2$ hydrocarbons was used. Another advantage of our process resides in the fact that it makes available for the production of liquid gasoline-like products hydrocarbon materials which hitherto could not be so used at all or could not be so used economically. Our process derives special advantage from the fact that propane is thus recoverable as a liquid gasoline-like product. Butane, for example, can be dehydrogenated and the resulting unsaturated products then catalytically polymerized, or it can be polymerized by thermal processes involving decomposition as well as polymerization. Propane is not readily handled by these methods applicable to butane. Substantial proportions of butane, moreover, can also be included in liquid motor fuels to provide proper vapor pressure characteristics, whereas propane is not useful in this manner. In this aspect, the process provides for the recovery of a valuable liquid product from propane which hitherto has had little if any more than fuel value.

To the extent that liquid phase conditions are maintained in the region of catalyst contact, our process enjoys several further incidental advantages. High capacities per unit of given size are thus attained. The catalyst is thus subjected to more or less continuous washing. Heavier condensation products which resist desorption in vapor phase operation and which tend to limit the effect of the catalyst as a matter of displacement, are thus removed. Such washing, in conjunction with the lower temperatures used, also appears to prolong the useful life of the phosphoric acid catalyst.

We claim:

1. In the catalytic condensation of normally gaseous hydrocarbons including saturates and unsaturates to produce normally liquid hydrocarbons of gasoline boiling range, the improvement which comprises passing a mixture of such hydrocarbons substantially free from ethane and containing not less than about 40 mol percent. of propane and butanes and a substantial proportion but not more than about 22 mol. percent. of normal butylene and isobutylene on its total content of $C_4$— hydrocarbons in contact with a phosphoric acid catalyst at a temperature of about 200°–450° F. under a pressure upwards of about 500 lbs. per square inch, whereby substantial condensation of saturates and unsaturates is effected.

2. In the catalytic condensation of normally gaseous hydrocarbons including saturates and unsaturates to produce normally liquid hydrocarbons of gasoline boiling range, the improvement which comprises passing a mixture of such hydrocarbons consisting predominantly of C₄₋ hydrocarbons and containing a negligible amount of C₂ hydrocarbons, said mixture further containing not less than about 40 mol percent. of propane and butanes and a substantial proportion but not more than about 22 mol percent. of normal butylene and isobutylene on its total content of C₄₋ hydrocarbons, in contact with a phosphoric acid catalyst at a temperature of about 200°–450° F. under a pressure upwards of about 500 lbs. per square inch, whereby substantial condensation of saturates and unsaturates is effected.

3. In the catalytic condensation of normally gaseous hydrocarbons including saturates and unsaturates to produce normally liquid hydrocarbons of gasoline boiling range, the improvement which comprises passing a mixture of such hydrocarbons substantially free from C₂ hydrocarbons and consisting predominantly of C₄₋ hydrocarbons containing not less than about 40 mol percent. of propane and butanes, not less than about 20 mol percent. of propane and a substantial proportion but not more than about 22 mol percent. of normal butylene and isobutylene on its total content of C₄₋ hydrocarbons in contact with a phosphoric acid catalyst at a temperature of about 200°–450° F. under a pressure upwards of about 500 lbs. per square inch, whereby substantial condensation of saturates and unsaturates is effected.

4. In the catalytic condensation of normally gaseous hydrocarbons including saturates and unsaturates to produce normally liquid hydrocarbons of gasoline boiling range, the improvement which comprises passing a mixture of such hydrocarbons containing a negligible amount of C₂ hydrocarbons and consisting predominantly of C₄₋ hydrocarbons containing not less than about 40 mol percent. of propane and butanes and a substantial proportion but not more than about 30 mol percent. of propylene and butylenes on its total content of C₄₋ hydrocarbons in contact with a phospheric acid catalyst at a temperature of about 200°–450° F. under a pressure upwards of about 500 lbs. per square inch, whereby substantial condensation of saturates and unsaturates is effected.

5. In the catalytic condensation of normally gaseous hydrocarbons including saturates and unsaturates to produce normally liquid hydrocarbons of gasoline boiling range, the improvement which comprises passing the mixture of such hydrocarbons substantially free from C₂ hydrocarbons and consisting predominantly of C₄₋ hydrocarbons containing not less than about 40 mol percent. of propane and butanes, not less than about 20 mol. percent. of propane and a substantial proportion but not more than about 30 mol percent. of propylene and butylenes on its total content of C₄₋ hydrocarbons in contact with a phosphoric acid catalyst at a temperature of about 200°–450° F. under a pressure upwards of about 500 lbs. per square inch, whereby substantial condensation of saturates and unsaturates is effected.

6. In the catalytic condensation of normally gaseous hydrocarbons including saturates and unsaturates to produce normally liquid hydrocarbons of gasoline boiling range, the improvement which comprises passing a mixture of such hydrocarbons substantially free from ethane and containing not less than about 40 mol percent. of propane and butanes and a substantial proportion but not more than about 22 mol percent. of normal butylene and isobutylene on its total content of C₄₋ hydrocarbons and further containing a substantial proportion of C₅ hydrocarbons in contact with a phosphoric acid catalyst at a temperature of about 200°–360° F. under a pressure upwards of about 700 lbs. per square inch, whereby substantial condensation of saturates and unsaturates is effected.

7. In the catalytic condensation of normally gaseous hydrocarbons including saturates and unsaturates to produce normally liquid hydrocarbons of gasoline boiling range, the improvement which comprises passing a mixture of such hydrocarbons substantially free from ethane and containing not less than about 40 mol percent. of propane and butanes and a substantial proportion but not more than about 22 mol. percent. of normal butylene and isobutylene on its total content of C₄₋ hydrocarbons in contact with a phosphoric acid catalyst at a temperature of about 200°–360° F. under a pressure upwards of about 700 lbs. per square inch, whereby substantial condensation of saturates and unsaturates is effected.

8. In the catalytic condensation of normally gaseous hydrocarbons including saturates and unsaturates to produce normally liquid hydrocarbons of gasoline boiling range, the improvement which comprises passing a mixture of such hydrocarbons consisting predominantly of C₄₋ hydrocarbons and containing a negligible amount of C₂ hydrocarbons, said mixture further containing not less than about 40 mol percent. of propane and butanes and a substantial proportion but not more than about 22 mol percent. of normal butylene and isobutylene on its total content of C₄₋ hydrocarbons, in contact with a phosphoric acid catalyst at a temperature of about 200°–360° F. under a pressure upwards of about 700 lbs. per square inch, whereby substantial condensation of saturates and unsaturates is effected.

9. In the catalytic condensation of normally gaseous hydrocarbons including saturates and unsaturates to produce normally liquid hydrocarbons of gasoline boiling range, the improvement which comprises passing a mixture of such hydrocarbons substantially free from C₂ hydrocarbons and consisting predominantly of C₄₋ hydrocarbons containing not less than about 40 mol percent. of propane and butanes, not less than about 20 mol percent. of propane and a substantial proportion but not more than about 22 mol percent. of normal butylene and isobutylene on its total content of C₄₋ hydrocarbons in contact with a phosphoric acid catalyst at a temperature of about 200°–360° F. under a pressure upwards of about 700 lbs. per square inch, whereby substantial condensation of saturates and unsaturates is effected.

10. In the catalytic condensation of normally gaseous hydrocarbons including saturates and unsaturates to produce normally liquid hydrocarbons of gasoline boiling range, the improvement which comprises passing a mixture of such hydrocarbons containing a negligible amount of C₂ hydrocarbons and consisting predominantly of C₄₋ hydrocarbons containing not less than about 40 mol percent. of propane and butanes and a substantial proportion but not more than about 30 mol percent. of propylene and butylenes on its total content of C₄₋ hydrocarbons in contact with a phosphoric acid catalyst at a temperature of about 200°–360° F. under a pressure upwards of about 700 lbs. per square inch, whereby substantial condensation of saturates and unsaturates is effected.

11. In the catalytic condensation of normally gaseous hydrocarbons including saturates and unsaturates to produce normally liquid hydrocarbons of gasoline boiling range, the improvement which comprises passing a mixture of such hydrocarbons substantially free from ethane and containing not less than about 40 mol percent. of propane and butanes and a substantial proportion but not more than about 22 mol percent. of normal butylene and isobutylene on its total content of $C_4$- hydrocarbons and further containing a substantial proportion of $C_5$ hydrocarbons in contact with a phosphoric acid catalyst at a temperature of about 200°–360° F. under a pressure upwards of about 700 lbs. per square inch, whereby substantial condensation of saturates and unsaturates is effected.

RODERICK D. PINKERTON.
WILLIAM MENDIUS.